United States Patent
Toya

(10) Patent No.: US 10,084,330 B2
(45) Date of Patent: Sep. 25, 2018

(54) BATTERY PACK AND CHARGER

(71) Applicant: Panasonic Intellectual Property Management Co., Ltd., Osaka (JP)

(72) Inventor: Shoichi Toya, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 212 days.

(21) Appl. No.: 14/824,137

(22) Filed: Aug. 12, 2015

(65) Prior Publication Data

US 2015/0349558 A1 Dec. 3, 2015

Related U.S. Application Data

(63) Continuation of application No. PCT/JP2015/000334, filed on Jan. 27, 2015.

(30) Foreign Application Priority Data

Feb. 13, 2014 (JP) ................................. 2014-025607

(51) Int. Cl.
*H02J 7/00* (2006.01)
*H02J 5/00* (2016.01)
(Continued)

(52) U.S. Cl.
CPC .......... *H02J 7/0045* (2013.01); *H01M 10/44* (2013.01); *H01M 10/46* (2013.01); *H01M 10/48* (2013.01); *H02J 5/00* (2013.01); *H02J 7/0021* (2013.01); *H02J 7/0026* (2013.01); *H02J 7/0047* (2013.01); *H02J 7/02* (2013.01);
(Continued)

(58) Field of Classification Search
USPC ....................................................... 320/110
See application file for complete search history.

(56) References Cited

U.S. PATENT DOCUMENTS

| 8,723,642 | B2 * | 5/2014 | Park | G07F 15/006 320/107 |
| 2007/0188144 | A1 * | 8/2007 | Hara | G06F 1/3203 320/132 |
| 2012/0306450 | A1 * | 12/2012 | Nakayama | G06F 1/263 320/134 |

FOREIGN PATENT DOCUMENTS

JP  2011-193656  9/2011

OTHER PUBLICATIONS

International Search Report of PCT application No. PCT/JP2015/000334 dated Mar. 31, 2015.

* cited by examiner

*Primary Examiner* — Robert Grant
(74) *Attorney, Agent, or Firm* — Greenblum & Bernstein, P.L.C.

(57) ABSTRACT

A battery pack includes a secondary battery, a connector that can be detachably connected to multiple different types of devices, control circuitry that controls power supply from the secondary battery and charge of the secondary battery, a detector that outputs the detected state of the secondary battery as secondary battery information, a first memory that stores the secondary battery information, a second memory that stores a recommendation table in which each of multiple conditions predetermined for the state of the secondary battery and a recommended device are associated with each other, a determiner that determines a recommended device from among the devices using the secondary battery information and recommendation table, and an informer that reports information indicating the recommended device determined by the determiner to the user.

18 Claims, 10 Drawing Sheets

(51) Int. Cl.
*H01M 10/44* (2006.01)
*H01M 10/48* (2006.01)
*H02J 7/02* (2016.01)
*H01M 10/46* (2006.01)
*H01M 10/42* (2006.01)

(52) U.S. Cl.
CPC .... *H01M 2010/4278* (2013.01); *H02J 7/0027* (2013.01); *H02J 2007/005* (2013.01)

FIG. 4

| DATE/TIME | CHARGE/DISCHARGE | SOC (%) | PERCENTAGE-TO-NOMINAL-CAPACITY SOC (%) |
|---|---|---|---|
| ⋮ | ⋮ | ⋮ | ⋮ |
| 2013/05/30 18:45 | CHARGE | 33% | 77% |
| 2013/05/30 22:38 | CHARGE | 100% | 77% |
| 2013/05/31 7:22 | DISCHARGE | 100% | 77% |
| 2013/05/31 7:35 | DISCHARGE | 68% | 76% |
| ⋮ | ⋮ | ⋮ | ⋮ |
| 2013/10/25 12:35 | DISCHARGE | 54% | 70% |
| ⋮ | ⋮ | ⋮ | ⋮ |

FIG. 5

| STATE OF SECONDARY BATTERY (PARAMETER) \ RECOMMENDED DEVICE / EXAMPLE DISPLAY | HIGH-OUTPUT-LOAD | LOW-OUTPUT-LOAD | HIGH-CAPACITY-LOAD |
|---|---|---|---|
| PERCENTAGE-TO-NOMINAL-CAPACITY SOC (%) | ≥ X [%] | < X [%] | ≥ α [%] |
| CHARGE/DISCHARGE CYCLE NUMBER | < Y [CYCLES] | ≥ Y [CYCLES] | |
| INTERNAL RESISTANCE VALUE | < Z [Ω] | ≥ Z [Ω] | |
| BATTERY VOLTAGE DIFFERENCE | < W [V] | ≥ W [V] | |

BATTERY PACK AND CHARGER

BACKGROUND

1. Technical Field

The present disclosure relates to a battery pack that can be detachably and electrically connected to multiple different types of devices and can supply power to a device connected thereto, and a charger for charging the battery pack.

2. Description of the Related Art

There have been chargers that when charging a battery pack, provide an indication related to the use of the battery pack to the user on the basis of the result of the charge. For example, Japanese Unexamined Patent Application Publication No. 2011-193656 discloses a charger which if the charger is charging multiple battery packs and if the charge of some of the battery packs has been completed, provides an indication indicating only one battery pack as being available on the basis of the order of the charge completion of the some battery packs in order to level the use frequencies of the battery packs.

SUMMARY

Among battery packs are those that can be connected to multiple different types of devices and used for the devices. Unfortunately, for such a battery pack, the charger of Japanese Unexamined Patent Application Publication No. 2011-193656 cannot provide an appropriate indication related to the use thereof.

One non-limiting and exemplary embodiment provides a battery pack that can be connected to multiple different types of devices and used for the devices and that can provide an appropriate indication related the use thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

A battery pack according to an aspect of the present disclosure includes a secondary battery, a connector that can be detachably and electrically connected to multiple different types of devices and a charger, control circuitry that controls power supply from the secondary battery to the devices through the connector and charge of the secondary battery by the charger through the connector, a detector that detects a state of the secondary battery and outputs the detected state as secondary battery information, a first memory that stores the secondary battery information outputted from the detector, a second memory that stores a recommendation table in which each of multiple conditions predetermined for the state of the secondary battery and a recommended device suitable for each of the conditions are associated with each other, a determiner that determines the recommended devices using the state of the secondary battery indicated by the secondary battery information and the recommendation table, and an informer that reports information indicating the recommended devices determined by the determiner to a user.

It should be noted that general or specific embodiments may be implemented as a system, a method, an integrated circuit, a computer program, a storage medium, or any selective combination thereof.

The battery pack and charger of the present disclosure can provide an appropriate indication related to the use of the battery pack.

BRIEF DESCRIPTION OF THE DRAWINGS

FIG. 4 is a diagram showing an example of a recommendation table;

FIG. 5 is a diagram showing log information stored in a first storage unit;

DETAILED DESCRIPTION

Figure 1:
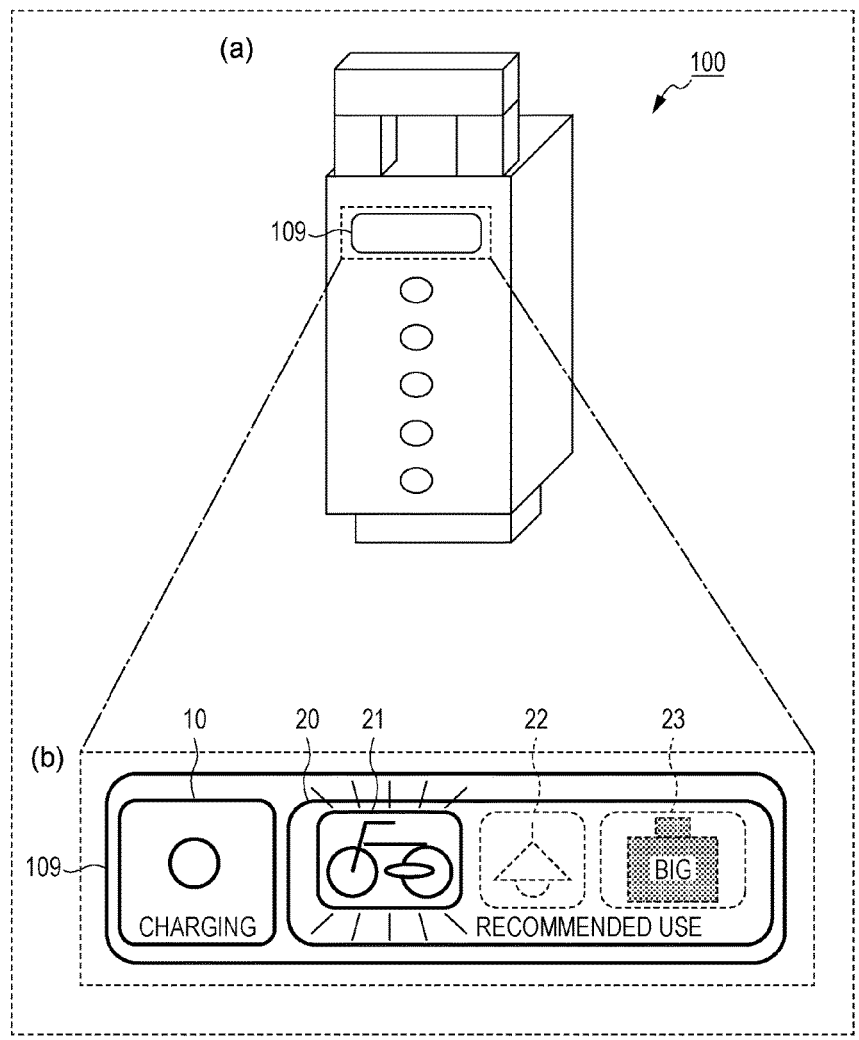
FIG. 1 is a drawing showing an appearance of a battery pack according to a first embodiment and details of an indicator thereof.

Underlying Knowledge Forming Basis of the Present Disclosure

The inventors found that the charger described in the BACKGROUND section posed the following problem.

With the charger of Japanese Unexamined Patent Application Publication No. 2011-193656, the user cannot properly determine a target device for which a battery pack capable of being connected to multiple different types of devices and used for the devices should be used. Examples of the multiple different types of devices include a high-output-load device such as an electric bicycle and a low-output-load device such as a lighting system. For this reason, the user may select a low-output-load battery pack for a high-output-load device. If the user makes such a selection, sufficient output may not be obtained from the high-output-load device. On the other hand, if the user selects, for a low-output-load device, a high-output-load battery pack which should be originally selected for a high-output-load device, a battery pack having an output suitable for the high-output-load device may become difficult to select.

To solve this problem, a first aspect of the present disclosure provides a battery pack including a secondary battery, a connector that can be detachably and electrically connected to multiple different types of devices and a charger, control circuitry that controls power supply from the secondary battery to the devices through the connector and charge of the secondary battery by the charger through the connector, a detector that detects a state of the secondary battery and outputs the detected state as secondary battery information, a first memory that stores the secondary battery information outputted from the detector, a second memory that stores a recommendation table in which each of multiple conditions predetermined for the state of the secondary battery and a recommended device suitable for each of the conditions are associated with each other, a determiner that determines the recommended devices using the state of the secondary battery indicated by the secondary battery information and the recommendation table, and an informer that reports information indicating the recommended devices determined by the determiner to a user.

Thus, this battery pack, which can be connected to multiple different types of devices and used for the devices, allows the user to determine, at a glance, a device for which the battery pack can be used effectively. As a result, this battery pack is more likely to be used for the recommended device for which the battery pack can be used effectively. When this battery pack is used for the recommended device, the battery pack can perform power supply suitable for the life, output performance, capacity, or the like of the battery pack.

A second aspect of the present disclosure provides a battery pack in which, in the first aspect, the second memory may be storing the multiple conditions predetermined for the state of the secondary battery, and the determiner may determine a device associated with a condition satisfied by the state of the secondary battery indicated by the secondary battery information, of the conditions in the recommendation table, from the types of devices as the recommended device.

A third aspect of the present disclosure provides a battery pack in which, in the first or second aspect, the detector may detect a date and time when the secondary battery has been charged or discharged, may output the detected date and time as the secondary battery information, and when a period of time elapsed since the date and time is less than a predetermined value, the determiner may determine the recommended device using the secondary battery information stored in the first memory and the recommendation table.

If the period of time elapsed since the date and time when the secondary battery has been charged or discharged lastly is less than the predetermined value, the secondary battery information indicating the state of the secondary battery is reliable. By determining the recommended device using this secondary battery information, the battery pack can correctly determine the recommended devices.

A fourth aspect of the present disclosure provides a battery pack in which, in any one of the first to third aspect of the present disclosure, for example, the detector may detect a date and time when the secondary battery has been charged or discharged, may output the detected date and time as the secondary battery information, and when a period of time elapsed since the date and time is a predetermined value or more, the determiner may determine the recommended device using the secondary battery information detected by the detector when the charger is newly charging the secondary battery under the control of the control circuitry and using the recommendation table.

If the period of time elapsed since the date and time when the secondary battery has been charged or discharged lastly is the predetermined value or more, the secondary battery information indicating the state of the secondary battery is not reliable. In this case, the determination unit determines the recommended devices using secondary battery information detected by the detector when the charger is newly charging the secondary battery. That is, if the secondary battery information is not reliable, the determination unit acquires reliable secondary battery information again and determines the recommended devices using the acquired secondary battery information. As a result, even if the period of time elapsed since the date and time when the secondary battery has been charged or discharged lastly is the predetermined value or more, the determination unit can correctly determine the recommended devices.

A fifth aspect of the present disclosure provides a battery pack in which, in the fourth aspect of the present disclosure, for example, when the period of time elapsed since the date and time is the predetermined value or more, the informer may avoid reporting information indicating the recommended device until the charger charges the secondary battery under the control of the control circuitry.

Thus, it is possible to prevent the determination unit from determining the recommended devices using unreliable secondary battery information.

A sixth aspect of the present disclosure provides a battery pack in which, in any one of the first to fifth aspects of the present disclosure, the battery pack may further include an indicator that indicates information indicating the recommended device, and the informer may cause the indicator to indicate the information indicating the recommended device.

Thus, the reporting unit indicates, on the indicator of the battery pack, the recommended device for which the battery pack should be used and therefore the user can confirm the recommended devices on the battery pack, even when there is no device other than the battery pack around the user.

A seventh aspect of the present disclosure provides a battery pack in which, in any one of the first to sixth aspects of the present disclosure, the charger may include an indicator, and the informer may transmit information indicating the recommended device to the charger through the connector to cause the charger to indicate the information indicating the recommended device.

An eighth aspect of the present disclosure provides a battery pack in which, in any one of the first to seventh aspects of the present disclosure, for example, the battery pack may further include a communicator that communicates with an external communication terminal including an indicator, and the informer may transmit information indicating the recommended device to the external communication terminal through the communicator to cause the external communication terminal to indicate the information indicating the recommended device.

Thus, even when the battery pack does not include any indicator, it is possible to report the recommended devices to the user.

A ninth aspect of the present disclosure provides a battery pack in which, in any one of the aspects of the present disclosure, the detector may detect a percentage-to-nominal-capacity SOC of the secondary battery as the state of the secondary battery, may output the detected percentage-to-nominal-capacity SOC as the secondary battery information, when the percentage-to-nominal-capacity SOC is a predetermined value or more, the determiner may determine a first device as the recommended device, and when the percentage-to-nominal-capacity SOC is less than the predetermined value, the determiner may determine a second device, the output load of which is lower than that of the first load, as the recommended device.

A tenth aspect of the present disclosure provides a battery pack in which, in any one of the first to ninth aspects of the present disclosure, for example, the detector may detect a charge/discharge cycle number of the secondary battery as the state of the secondary battery, when the charge/discharge cycle number is less than a predetermined value, the determiner may determine a first device as the recommended device, and when the charge/discharge cycle number is the predetermined value or more, the determiner may determine a second device, the output load of which is lower than that of the first load, as the recommended device.

An eleventh aspect of the present disclosure provides a battery pack in which, in any one of the first to tenth aspects of the present disclosure, for example, the detector may detect an internal resistance value of the secondary battery as the state of the secondary battery, when the internal resistance value is less than a predetermined value, the determiner may determine a first device as the recommended device, and when the internal resistance value is the predetermined value or more, the determiner may determine a second device, the output load of which is lower than that of the first load, as the recommended device.

A twelfth aspect of the present disclosure provides a battery pack in which, in any one of the first to eleventh aspects of the present disclosure, for example, the detector may detect a battery voltage difference of the secondary battery as the state of the secondary battery, when the battery voltage difference is less than a predetermined value, the determiner may determine a first device as the recommended device, and when the battery voltage difference is the predetermined value or more, the determiner may determine a second device, the output load of which is lower than that of the first load, as the recommended device.

A thirteenth aspect of the present disclosure provides a battery pack in which, in any one of the first to twelfth aspects of the present disclosure, for example, the detector may detect a percentage-to-nominal-capacity SOC of the secondary battery as the state of the secondary battery, when the percentage-to-nominal-capacity SOC is a predetermined value or more, the determiner may determine a device requiring a first capacity as the recommended device, and if the percentage-to-nominal-capacity SOC is less than the predetermined value, the determiner may determine a device requiring a second capacity, which is lower than the first capacity, as the recommended device.

A fourteen aspect of the present disclosure provides a battery pack in which, in any one of the first to thirteenth aspects of the present disclosure, the detector may further detect an abnormal state of the secondary battery, and when the detector detects an abnormal state of the secondary battery, the informer may report information indicating the abnormal state to a user.

Thus, the user can confirm the recommended device, as well as, when the battery pack is abnormal, can confirm that the battery pack is abnormal.

A fifteen aspect of the present disclosure provides a battery pack in which, in any one of the first to fourteenth aspects of the present disclosure, the battery pack may further include an input receiver that receives device information indicating device. The second memory may store the recommendation table in which the types of devices and the device information received by the input receiving unit are associated with each other. The determiner may determine the recommended devices from among the devices indicated by the device information among the devices in the recommendation table.

Since the battery pack determines the recommended devices from the devices indicated by the device information received by the input receiving unit, the indicator can indicate only the devices possessed by the user as recommended devices. Thus, any devices which are not possessed by the user are not recommended, and the user can easily determine a device for which the battery pack should be used.

A sixteenth aspect of the present disclosure provides a charger for charging a battery pack which includes a secondary battery and can be used for multiple of different types of devices. The charger includes a battery connector that is detachably connected to the battery pack, charging control circuitry that charges the battery pack through the battery connector, a battery detector that detects a state of the secondary battery through the battery connector and outputs the detected state as secondary battery information, a memory that is storing a recommendation table in which each of multiple conditions predetermined for the state of the secondary battery and a recommended device suitable for each of the conditions are associated with each other, a device determiner that determines the recommended devices using the state of the secondary battery indicated by the secondary battery information and the recommendation table, an indicator, and indication control circuitry that causes the indicator to indicate information indicating the recommended devices determined by the device determiner.

It should be noted that general or specific embodiments may be implemented as a system, a method, an integrated circuit, a computer program, a storage medium such as a computer-readable CD-ROM, or any selective combination thereof.

Now, a battery pack and charger according to one aspect of the present disclosure will be described in detail with reference to the drawings.

It should be noted that embodiments described below are only illustrative of the present disclosure. The numbers, shapes, materials, elements, the positions and connection forms of the elements, steps, the order of the steps, and the like described in the embodiments are also only illustrative and do not limit the present disclosure. Of the elements of the embodiments, elements which are not set forth in the independent claims representing the highest concept are described as optional elements.

First Embodiment

FIG. 1 is a drawing showing an appearance of a battery pack according to a first embodiment and details of an indicator thereof. More specifically, FIG. 1(a) is a perspective view showing an appearance of a battery pack 100, and FIG. 1(b) is a drawing showing details of an indicator 109 of the battery pack 100.

As shown in FIG. 1(a), the battery pack 100 includes the indicator 109. As shown in FIG. 1(b), the indicator 109 includes a first indicator 10 for indicating the charge state and a second indicator 20 for indicating a target device (i.e., a recommended device) suitable for the battery pack 100.

For example, the first indicator 10 is a light-emitting diode (LED) and provides an indication indicating that the battery pack is being charged (blinking), an indication indicating that the battery pack is abnormal (quick blinking), or an indication indicating that the battery pack is fully charged (light-up).

The second indicator 20 includes a first recommendation indication 21, a second recommendation indication 22, and a third recommendation indication 23. The first recommendation indication 21 is an indication recommending that the battery pack be used for a high-output-load device. The second recommendation indication 22 is an indication recommending that the battery pack be used for a low-output-load device. The third recommendation indication 23 is an indication recommending that the battery pack be used for a large-capacity-load device. The second indicator 20 recommends a target device for which the battery pack 100 should be used, by providing one of the first recommendation indication 21, second recommendation indication 22, and third recommendation indication 23. Note that FIG. 1(b) shows that the first recommendation indication 21 is being provided.

Figure 2:
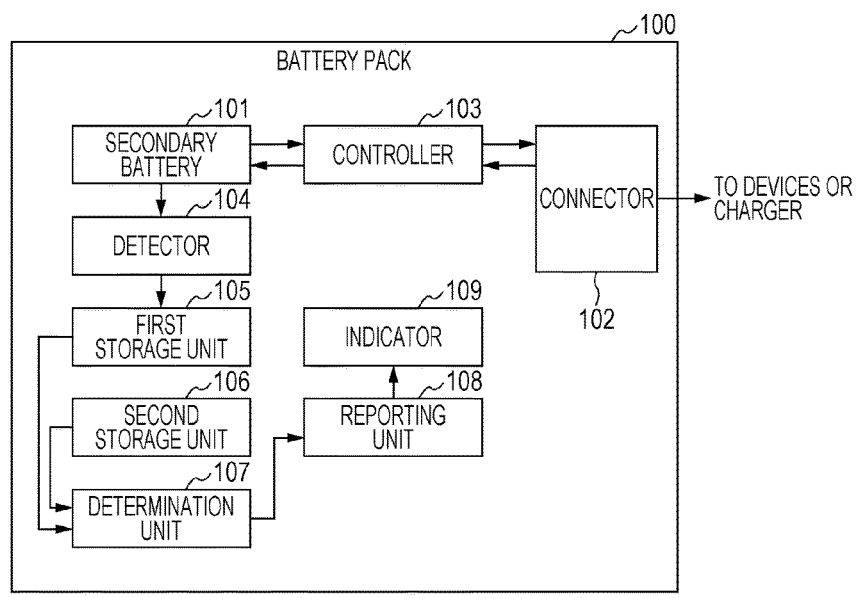
FIG. 2 is a block diagram showing an example of the configuration of the battery pack according to the first embodiment.

FIG. 2 is a block diagram of the battery pack according to the first embodiment.

As shown in FIG. 2, the battery pack 100 includes a secondary battery 101, a connector 102, a controller 103, a detector 104, a first storage unit 105, a second storage unit 106, a determination unit 107, a reporting unit 108, and the indicator 109.

The secondary battery 101 is formed by connecting multiple cells (e.g., lithium-ion batteries) in parallel and series. The configuration of the secondary battery 101 will be described later.

The connector 102 can be detachably and electrically connected to multiple different types of devices. The connector 102 may be detachably and mechanically connectable to multiple different types of devices.

The controller 103 controls the power supply from the secondary battery 101 to multiple types of devices through the connector 102 and the charge of the secondary battery by the charger through the connector 102.

The detector 104 detects the state of the secondary battery and outputs the detected state as secondary battery information. For example, the detector 104 may detect the percentage-to-nominal-capacity SOC (state of charge) of the secondary battery 101 as the state of the secondary battery 101. The detector 104 may detect charge/discharge cycle number of the secondary battery 101 as the state of the secondary battery 101. The detector 104 may also detect the internal resistance value of the secondary battery 101 as the state of the secondary battery 101. The detector 104 may also detect the battery voltage difference of the secondary battery 101 as the state of the secondary battery 101. That is, the detector 104 may detect at least one of the percentage-to-nominal-capacity SOC, charge/discharge cycle number, internal resistance value, and battery voltage difference of the secondary battery 101 as the state of the secondary battery 101 and may output the detected percentage-to-nominal-capacity SOC or the like as secondary battery information. The detector 104 may also detect the date and time when the secondary battery 101 has been charged or discharged and output the detected date and time as secondary battery information. In this case, the detector 104 may detect the date and time by acquiring date/time information indicating the date and time from a measuring unit (not shown) which uses a CPU or the like included in the battery pack 100 or by acquiring date/time information through a communication with an external device.

As used herein, the "percentage-to-nominal-capacity SOC" refers to the percentage of the discharge capacity of the fully charged secondary battery to the nominal capacity [%]. The "nominal capacity" refers to the discharge capacity of the fully charged secondary battery at the time of factory shipment. The "charge/discharge cycle number" refers to the number of times the fully charged secondary battery has been fully discharged. The "internal resistance value" refers to the value of the internal resistance of the secondary battery. The "battery voltage difference" refers to the voltage difference between a battery (cell group) having the highest voltage and a battery (cell group) having the lowest voltage of the series-connected multiple batteries [including series-connected multiple cell groups (see below)].

Figure 3:
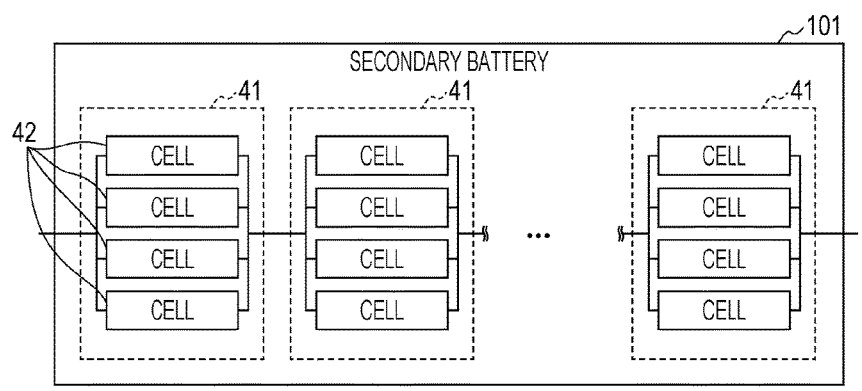
FIG. 3 is a diagram showing an example of the configuration of a secondary battery.

FIG. 3 is a diagram showing an example of the configuration of the secondary battery 101.

As shown in FIG. 3, the secondary battery 101 is formed by series-connecting multiple (e.g., 7) cell groups 41 (also referred to as blocks) in each of which four cells 42 are connected in parallel. In other words, in the example of FIG. 3, the secondary battery 101 is formed by connecting 28 cells 42 in parallel and series. The battery voltage difference of the secondary battery 101 thus configured is the voltage difference between a cell group having the highest voltage and a cell group having the lowest voltage of the series-connected multiple cell groups 41.

The first storage unit 105 stores the secondary battery information outputted from the detector 104. For example, the first storage unit 105 is implemented by a non-volatile memory.

FIG. 4 is a diagram showing log information stored in the first storage unit.

As shown in FIG. 4, the log information is information indicating the date and time when the secondary battery 101 has been charged or discharged, which is detected by the detector 104. Note that in the log information, at least one of the percentage-to-nominal-capacity SOC, charge/discharge cycle number, internal resistance value, and battery voltage difference, which are secondary battery information other than the date and time when the secondary battery has been charged or discharged, may be associated with the detected date and time. In the example of FIG. 4, the log information is stored in the first storage unit 105 in such a manner that the date and time, charge/discharge, SOC, and percentage-to-nominal-capacity SOC are associated with one another.

The second storage unit 106 is storing a recommendation table in which a condition predetermined based on the state of the secondary battery and multiple recommended devices suitable for the condition are previously associated with each other. The second storage unit 106 may be storing multiple conditions predetermined based on the state of the secondary battery 101.

FIG. 5 is a diagram showing an example of the recommendation table.

As shown in FIG. 5, in the recommendation table, multiple conditions predetermined based on the respective degrees of the percentage-to-nominal-capacity SOC, charge/discharge cycle number, internal resistance value, and battery voltage difference, which are the states of the secondary battery, and devices having purposes suitable for the conditions are previously associated with each other.

Specifically, a percentage-to-nominal-capacity SOC of X [%] or more is associated with a high-output-load recommended device, and a percentage-to-nominal-capacity SOC of less than X [%] is associated with a low-output-load recommended device. Further, a percentage-to-nominal-capacity SOC of α[%] or more may be associated with a large-capacity-load recommended device. A charge/discharge cycle number of less than Y [cycles] is associated with a high-output-load recommended device, and a charge/discharge cycle number of Y [cycles] or more is associated with a low-output-load recommended device. An internal resistance value of less than Z [Ω] is associated with a high-output-load recommended device, and an internal resistance value of Z [Ω] or more is associated with a low-output-load recommended device. A battery voltage difference of less than W [V] is associated with a highoutput-load recommended device, and a battery voltage difference of W [V] or more is associated with a low-output-load recommended device. As used herein, the "recommended device" refers to a device having a purpose suitable for the state of the secondary battery 101, of the different types of devices.

The determination unit 107 determines a recommended device from the devices using the state of the secondary battery 101 and the recommendation table. If the period of time elapsed since the date and time when the secondary battery has been charged or discharged lastly is less than a predetermined value, the determination unit 107 may determine a recommended device using the secondary battery information stored in the first storage unit 105 and the recommendation table. If the period of time elapsed since the date and time when the secondary battery has been charged or discharged lastly is the predetermined value or more, the determination unit 107 may wait until a charger (not shown) connected to the connector 102 newly charges the secondary battery 101 under the control of the controller 103 and subsequently may determine a recommended device using secondary battery information detected by the detector 104 when the charger is newly charging the secondary battery 101 and using the recommendation table. The determination unit 107 may determine whether the elapsed period of time is the predetermined value or more, by comparing the date and time when the secondary battery 101 has been charged or discharged lastly, which is detected by the detector 104, with the current time. That is, in the above description, the case where the period of time elapsed since the date and time when the secondary battery has been charged or discharged lastly is less than the predetermined value refers to a case where the determination unit 107 determines that the elapsed period of time is less than the predetermined value, and the case where the period of time elapsed since the date and time when the secondary battery has been charged or discharged lastly is the predetermined value or more refers to a case where the determination unit 107 determines that the elapsed period of time is the predetermined value or more.

Specifically, the determination unit 107 determines a recommended device using the state of the secondary battery 101 and the recommendation table as follow. If the percentage-to-nominal-capacity SOC is a predetermined value (X [%]) or more, the determination unit 107 determines a high-output-load device as the recommended device; if the percentage-to-nominal-capacity SOC is less than the predetermined value (X [%]), it determines a low-output-load device as the recommended device. Further, if the percentage-to-nominal-capacity SOC is a predetermined value ($\alpha$[%]) or more, the determination unit 107 determines a device requiring a large capacity (large-capacity-load device) as the recommended device; if the percentage-to-nominal-capacity SOC is less than the predetermined value ($\alpha$[%]), it determines a requiring a small capacity (small-capacity-load device) as the recommended device. Further, if the charge/discharge cycle number is less than a predetermined value (Y [cycles]), the determination unit 107 determines a high-output-load device as the recommended device; if the charge/discharge cycle number is the predetermined value (Y [cycles]) or more, it determines a low-output-load device as the recommended device. Further, if the internal resistance value is less than a predetermined value (Z [$\Omega$]), the determination unit 107 determines a high-output-load device as the recommended device; if the internal resistance value is the predetermined value (Z [$\Omega$]) or more, it determines a low-output-load device as the recommended device. Further, if the battery voltage difference is less than a predetermined value (W [V]), the determination unit 107 determines a high-output-load device as the recommended device; if the battery voltage difference is the predetermined value (W [V]) or more, it determines a low-output-load device as the recommended device. That is, the determination unit 107 determines, as the recommended device, a device associated with the condition satisfied by the state of the secondary battery 101 in the recommendation table.

While the determination unit 107 determines the recommended device using the percentage-to-nominal-capacity SOC, charge/discharge cycle number, internal resistance value, and battery voltage difference as the states of the secondary battery detected by the detector 104, it only has to determine the recommended device using one of these states. That is, the determination unit 107 may determine the recommended device on the basis of one of the percentage-to-nominal-capacity SOC, charge/discharge cycle number, internal resistance value, and battery voltage difference or may determine the recommended device on the basis of any combinations thereof. For example, if the percentage-to-nominal-capacity SOC is the predetermined value (X [%]) or more, and if the charge/discharge cycle number is less than the predetermined value (Y [cycles]), and if the internal resistance value is the predetermined value (Z [$\Omega$]) or more, the determination unit 107 may determine a high-output-load device as the recommended device, since the number of the indexes recommending a high-output-load device is greater than the number of the indexes recommending a low-output-load device. Thus, the reporting unit 108 may report the information indicating the recommended device to the user.

The reporting unit 108 reports, to the user, information indicating the recommended device determined by the determination unit 107 by indicating the information on the indicator 109. If the period of time elapsed since the date and time when the secondary battery has been charged or discharged lastly is the predetermined value or more, the reporting unit 108 may avoid reporting information indicating the recommended device until the charger charges the secondary battery under the control of the controller.

The indicator 109 indicates the information indicating the recommended device. For example, the indicator 109 may be a liquid crystal display or organic EL display, or may indicate a previously drawn picture or characters for providing a recommendation indication by selectively lighting up one of multiple lamps such as LEDs. For example, as described with reference to FIG. 1(b), the indicator 109 indicates the information indicating the recommended device to the user by providing one of the first recommendation indication 21, second recommendation indication 22, and third recommendation indication 23.

Next, processes performed by the battery pack 100 will be described. The processes performed by battery pack 100 include two processes: a log information acquisition process and a recommendation indication process.

Figure 6:
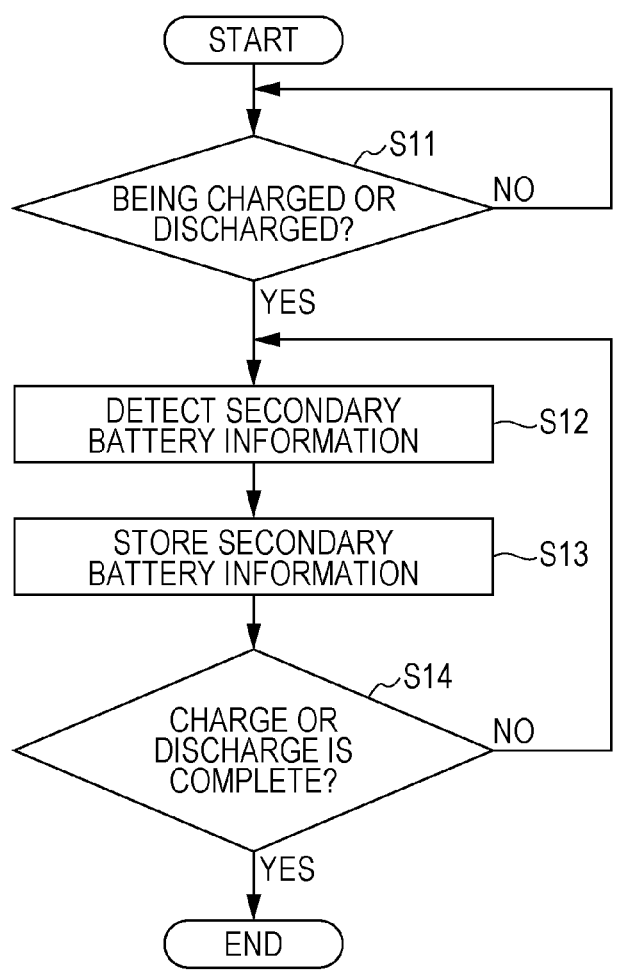
FIG. 6 is a flowchart showing an example of a log information acquisition process.

FIG. 6 is a flowchart showing an example of the log information acquisition process.

In the log information acquisition process, first, the controller 103 determines whether the secondary battery 101 is being charged or discharged (S11). That is, the log information acquisition process is performed when the secondary battery 101 is being charged or discharged.

If so determined (S11: Yes), the detector 104 detects secondary battery information of the secondary battery 101 (S12). More specifically, the detector 104 detects the date and time when the secondary battery 101 has been charged or discharged and the percentage-to-nominal-capacity SOC, charge/discharge cycle number, internal resistance value, and battery voltage difference of the secondary battery 101 as secondary battery information of the secondary battery 101 and outputs these pieces of secondary battery information to the first storage unit 105. If not so determined (S11: No), the process returns to step S11. That is, the detector 104 avoids detecting secondary battery information of the secondary battery 101 until the charge or discharge of the secondary battery 101 starts.

The first storage unit 105 stores the secondary battery information outputted from the detector 104 (S13).

Subsequently, the controller 103 determines whether the charge or discharge of the secondary battery 101 is complete (S14). If so determined (S14: Yes), the log information acquisition process ends.

If not so determined (S14: No), steps S12 and S13 are repeated. In this case, steps S12 and S13 may be repeated after a predetermined period of time elapses.

As described above, the log information acquisition process is performed when the secondary battery 101 is being charged or discharged. This is because during the charge or discharge period, the state of the secondary battery 101 is more likely to change; during the other periods; the state of the secondary battery 101 is less likely to change and therefore there is no much need to acquire log information. However, the secondary battery 101 is self-discharged even during the other periods and therefore the state of the secondary battery 101 can change. To address this situation, the detector 104 may acquire the state of the secondary battery 101 every predetermined period of time even during the other periods.

Figure 7:
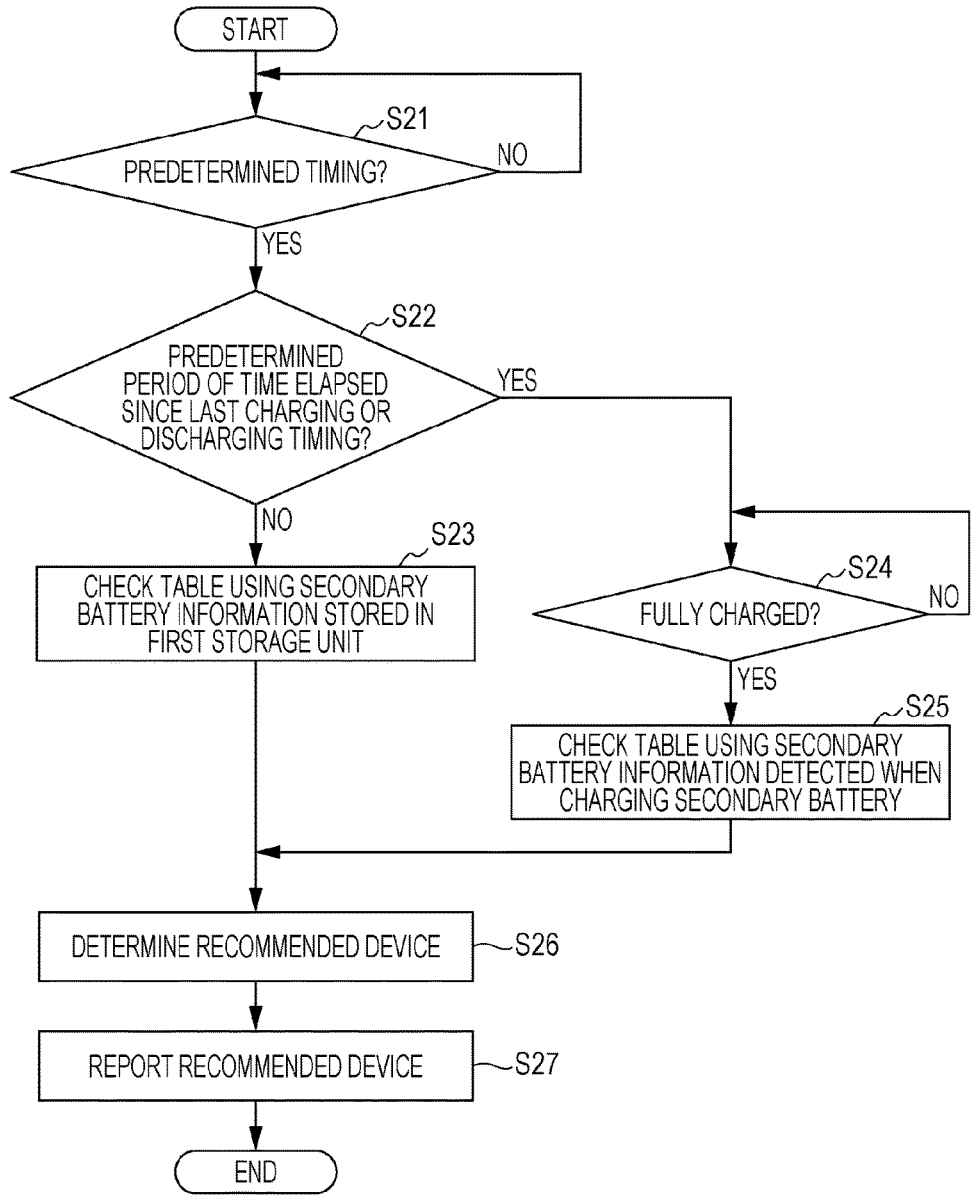
FIG. 7 is a flowchart showing an example of a recommendation indication process.

FIG. 7 is a flowchart showing an example of the recommendation indication process.

The battery pack 100 performs the recommendation indication process when a predetermined timing comes. Specifically, in the recommendation indication process, first, the controller 103 determines whether the predetermined timing has come (S21). The "predetermined timing" may be the timing when the charge of the secondary battery 101 has been completed or may be a time predetermined by the user. If the battery pack includes an input receiving unit (to be discussed later), the predetermined timing may be the timing when the user presses, for example, a physical button of the battery pack.

If the controller 103 determines that the predetermined timing has come (S21: Yes), the determination unit 107 determines whether the period of time elapsed since the date and time when the secondary battery 101 has been charged or discharged lastly is the predetermined value or more (S22). If the controller 103 determines that the predetermined timing has not come (S21: No), the determination in step S21 is repeated. That is, the determination unit 107 avoids performing the determination in step S22 until the charge of the secondary battery 101 is complete.

If the determination unit 107 determines that the period of time elapsed since the date and time when the secondary battery has been charged or discharged lastly is less than the predetermined value (S22: No), it checks the recommendation table using the secondary battery information stored in the first storage unit 105 (S23).

In contrast, if the determination unit 107 determines that the period of time elapsed since the date and time when the secondary battery has been charged or discharged lastly is the predetermined value or more (S22: Yes), the controller 103 determines whether the secondary battery 101 is fully charged (S24). If the controller 103 determines that the secondary battery 101 is fully charged, the determination unit 107 checks the recommendation table using secondary battery information detected by the detector 104 during the charge leading the current full charge (S25). That is, if the determination unit 107 that the period of time elapsed since the date and time when the secondary battery has been charged or discharged lastly is the predetermined value or more, it avoids checking the recommendation table using secondary battery information until the secondary battery is fully charged.

The determination unit 107 then determines the recommended device on the basis of the check result in step S23 or the check result in step S25 (S26).

Subsequently, the reporting unit 108 reports information indicating the recommended device determined by the determination unit 107 to the user by indicating the information on the indicator 109 (S27), thereby ending the recommendation indication process.

As seen above, the battery pack 100 according to the first embodiment, which can be connected to multiple different types of devices and used for the devices, allows the user to determine, at a glance, a recommended device for which the battery pack 100 can be used effectively. Thus, the battery pack 100 is more likely to be used for the recommended device. If the battery pack 100 is used for the recommended device, it can perform power supply suitable for the life or ability thereof.

Further, according to the battery pack 100 according to the first embodiment, if the period of time elapsed since the date and time when the secondary battery has been charged or discharged lastly is less than the predetermined value, the determination unit 107 determines the recommended device using the secondary battery information indicating the state of the secondary battery 101 by using the fact that the secondary battery information is reliable. Thus, the determination unit 107 can correctly determine the recommended device, and the reporting unit 108 can report the correctly determined recommended device.

If the period of time elapsed since the date and time when the secondary battery has been charged or discharged lastly is the predetermined value or more, the secondary battery information indicating the state of the secondary battery 101 is not reliable. In this case, the determination unit 107 determines the recommended device using secondary battery information detected by the detector 104, of the secondary battery 101 being newly charged by the charger under the control of the controller 103. That is, if the secondary battery information is not reliable, the determination unit 107 acquires reliable secondary battery information again and determines the recommended device using the acquired secondary battery information. Thus, even if the period of time elapsed since the date and time when the secondary battery has been charged or discharged lastly is the predetermined value or more, the determination unit 107 can correctly determine the recommended device.

In this case, the reporting unit 108 avoids reporting information indicating the recommended device until the charger charges the secondary battery 101 under the control of the controller 103. Thus, it is possible to prevent the determination unit 107 from determining the recommended device using unreliable secondary battery information.

Further, the battery pack 100 according to the first embodiment indicates information indicating the recommended device on the indicator 109. Thus, the user can confirm, on the battery pack, the recommended device for which the battery pack should be used, even when there is no device other than the battery pack around the user.

In the battery pack 100 according to the first embodiment, multiple different types of devices are classified into two types, that is, a low-output-load device and a low-output-load device in accordance with the degree of the output load of the device. However, the devices may be classified into three or more types in accordance with the degree of the output load of the device. Similarly, while the multiple different types of devices are classified into two types, that is, a large-capacity-load device and a small-capacity-load device in accordance with the degree of the capacity load of the device, the devices may be classified into three or more types in accordance with the degree of the capacity load of the device. Thus, the user can more accurately and easily determine a device suitable for the power supply of the battery pack 100.

In the battery pack 100 according to the first embodiment, the detector 104 may further detect an abnormal state of the secondary battery 101. If the detector 104 detects an abnormal state of the secondary battery 101, the reporting unit 108 may report information indicating the abnormal state to the user. In this case, the detector 104 may detect an abnormal state of the secondary battery 101, for example, after the determination in step S22 of the recommendation process flowchart of FIG. 7. For example, if a No determination is made in step S22 and then the detector 104 detects an abnormal state of the secondary battery 101, the reporting unit 108 may cause the indicator 109 to provide an indication indicating that the secondary battery 101 is abnormal, thereby ending the recommendation process. If a Yes determination is made in step S22, the detector 104 may detect an abnormal state of the secondary battery 101 before making a determination as to whether the secondary battery is fully charged in step S24. In this case also, when the detector 104 detects an abnormal state of the secondary battery 101, the reporting unit 108 may cause the indicator 109 to provide an indication indicating that the secondary battery 101 is abnormal, thereby ending the recommendation process.

The detector 104 detects an abnormal state of the secondary battery 101 as follows: the detector 104 detects at least one of the charge/discharge cycle number, internal resistance value, and battery voltage difference, and if the detected charge/discharge cycle number or the like falls outside a predetermined range, it determines that the secondary battery 101 is abnormal. Alternatively, if the first storage unit 105 of the battery pack 100 is storing at least one of the total amount of charge/discharge, operating temperature histories, and storage temperature histories, the detector 104 may refer to the total amount of charge/discharge or the like of the battery pack 100 and, if the value falls outside a predetermined range, may determine that the secondary battery 101 is abnormal.

Second Embodiment

While, in the battery pack 100 according to the first embodiment, the reporting unit 108 causes the indicator 109 included in the battery pack 100 to indicate the recommended device determined by the determination unit 107, the reporting unit 108 may cause an indicator included in a device other than the battery pack 100 to indicate the recommended device.

Figure 8:
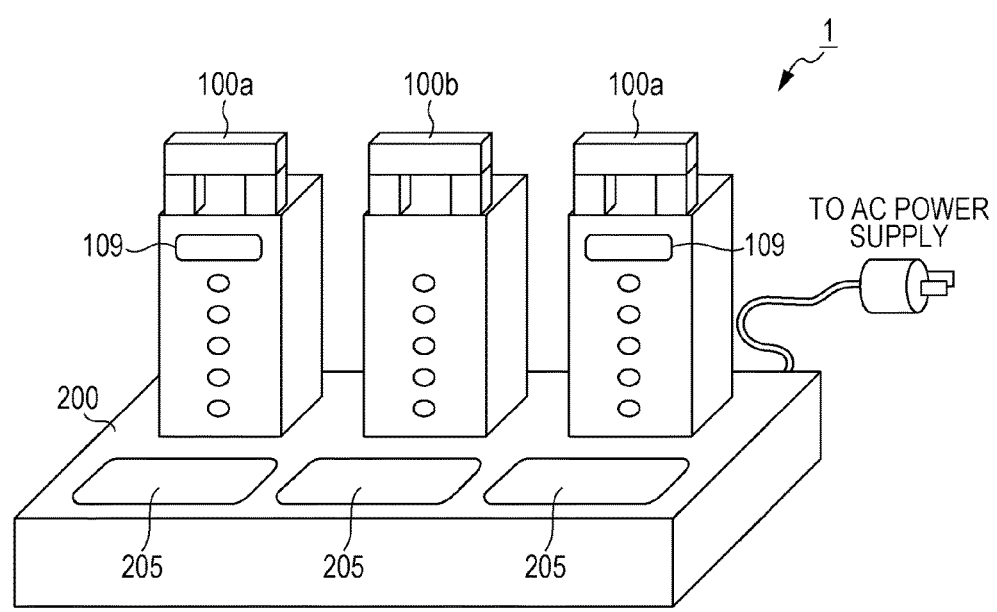
FIG. 8 is a drawing showing an appearance of a battery system according to a second embodiment.
Figure 9:
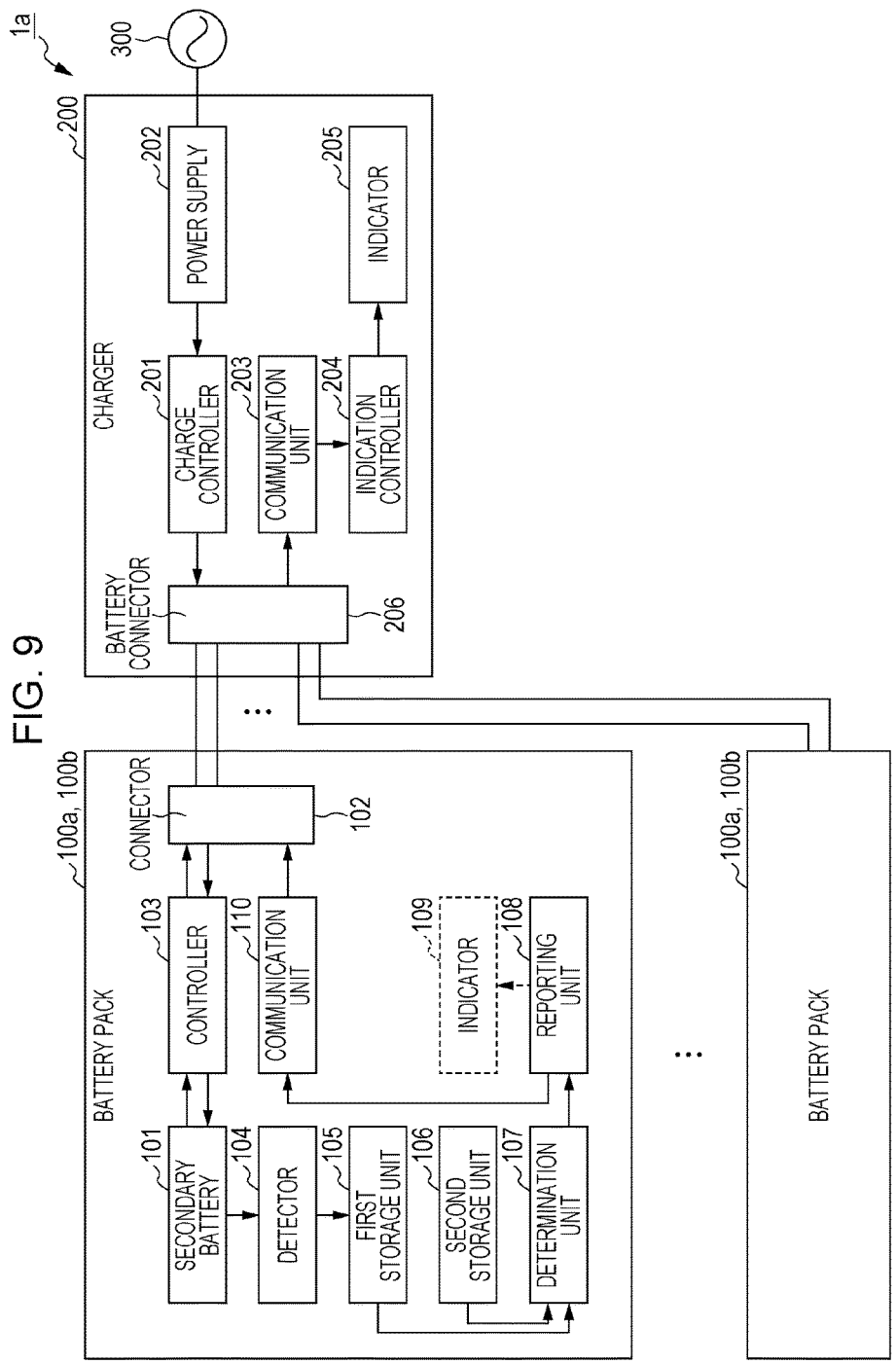
FIG. 9 is a block diagram showing an example of the configuration of the battery system according to the second embodiment.

FIG. 8 is a drawing showing an appearance of a battery system including battery packs according to a second embodiment. FIG. 9 is a block diagram showing an example of the configuration of the battery system according to the second embodiment.

As shown in FIGS. 8 and 9, a battery system 1 includes multiple battery packs, 100a and 100b, and a charger 200.

The battery pack 100a includes the elements of the battery pack 100 according to the first embodiment, as well as a communication unit 110. The battery pack 100b includes the elements of the battery pack 100 according to the first embodiment, as well as a communication unit 110, but it lacks the indicator 109. The elements common to the battery packs 100a and 100b and the battery pack 100 according to the first embodiment will not be described.

A reporting unit 108 outputs, to the communication unit 110, information indicating a recommended device determined by a determination unit 107. The communication unit 110 transmits the information indicating the recommended device outputted by the reporting unit 108 to the charger 200 through a connector 102. That is, the reporting unit 108 transmits the information indicating the recommended device to the charger 200 through the connector 102 to cause the charger 200 to indicate the information. Thus, the reporting unit 108 reports the information indicating the recommended device to the user. The connector 102 can transfer power between the secondary battery 101 and a device connected to the connector 102, as well as can receive or output communication data to or from the communication unit 110.

The charger 200 includes a charge controller 201, a power supply 202, a communication unit 203, an indication controller 204, indicators 205, and a battery connector 206.

The charge controller 201 charges the battery packs 100a and 100b by supplying direct-current power from the power supply 202 to the battery packs 100a and 100b through the battery connector 206. The charge controller 201 completes the charge when the battery packs 100a and 100b are fully charged.

The power supply 202 converts alternating-current power from an AC power supply 300, which is a commercial power supply, into direct-current power, further converts the direct-current power into direct-current power having a voltage suitable for the battery packs 100a and 100b, and supplies the direct-current power to the charge controller 201.

The communication unit 203 receives information transmitted from the communication units 110 of the battery packs 100a and 100b. Specifically, the communication unit 203 receives information indicating the recommended devices transmitted from the communication units 110 of the battery packs 100a and 100b and then transmits the information to the charger 200.

The indication controller 204 indicates, on the indicators 205, the information indicating the recommended devices received by the communication unit 203.

The indicators 205 indicate the information indicating the recommended devices. Details of indications provided by the indicators 205 are similar to those of the indicator 109 described with reference to FIG. 1(b) and therefore will not be described.

The battery connector 206 can be detachably and electrically connected to the connectors 102 of the battery packs 100a and 100b. The battery connector 206 can transfer power between the battery packs 100a and 100b and charge controller 201, as well as can receive or output communication data from or to the communication unit 110.

In the battery packs 100a and 100b according to the second embodiment, the reporting units 108 cause the indicator 205 of the charger 200 to indicate the recommended devices determined by the determination units 107, by transmitting information indicating the recommended devices to the charger 200 through the communication units 110. As seen above, the reporting units 108 may report the information indicating the recommended devices to the indicator 205 included in the charger 200 rather than to the battery packs. Thus, even a battery pack which lacks the indicator 109, such as the battery pack 100b, can report the recommended device to the user.

While, in the battery packs 100a and 100b according to the second embodiment, the reporting units 108 transmits the information indicating the recommended devices to the charger 200 through the communication units 110 to cause the charger 200 to indicate the information, the reporting units 108 may report the information to a device other than the charger 200. For example, the reporting units 108 may transmit the information indicating the recommended devices to an external communication terminal having a display unit, such as a smartphone, through the communication units 110 to cause the external communication terminal to indicate the information. In this way, the reporting units 108 may report the information indicating the recommended devices to the user. In this case, the communication units 110 have to be capable of communicating with the external communication terminal. Specifically, the communication units 110 have to be communication interfaces which can be connected to external communication terminals by wire, or communication modules capable of wireless communication by a wireless LAN, Bluetooth®, or the like.

Third Embodiment

While, in the battery packs 100, 100a, and 100b according to the first and second embodiments, the detectors 104 included therein detect the states of the secondary batteries 101, a charger may detect the state of the secondary battery of the battery pack.

Figure 10:
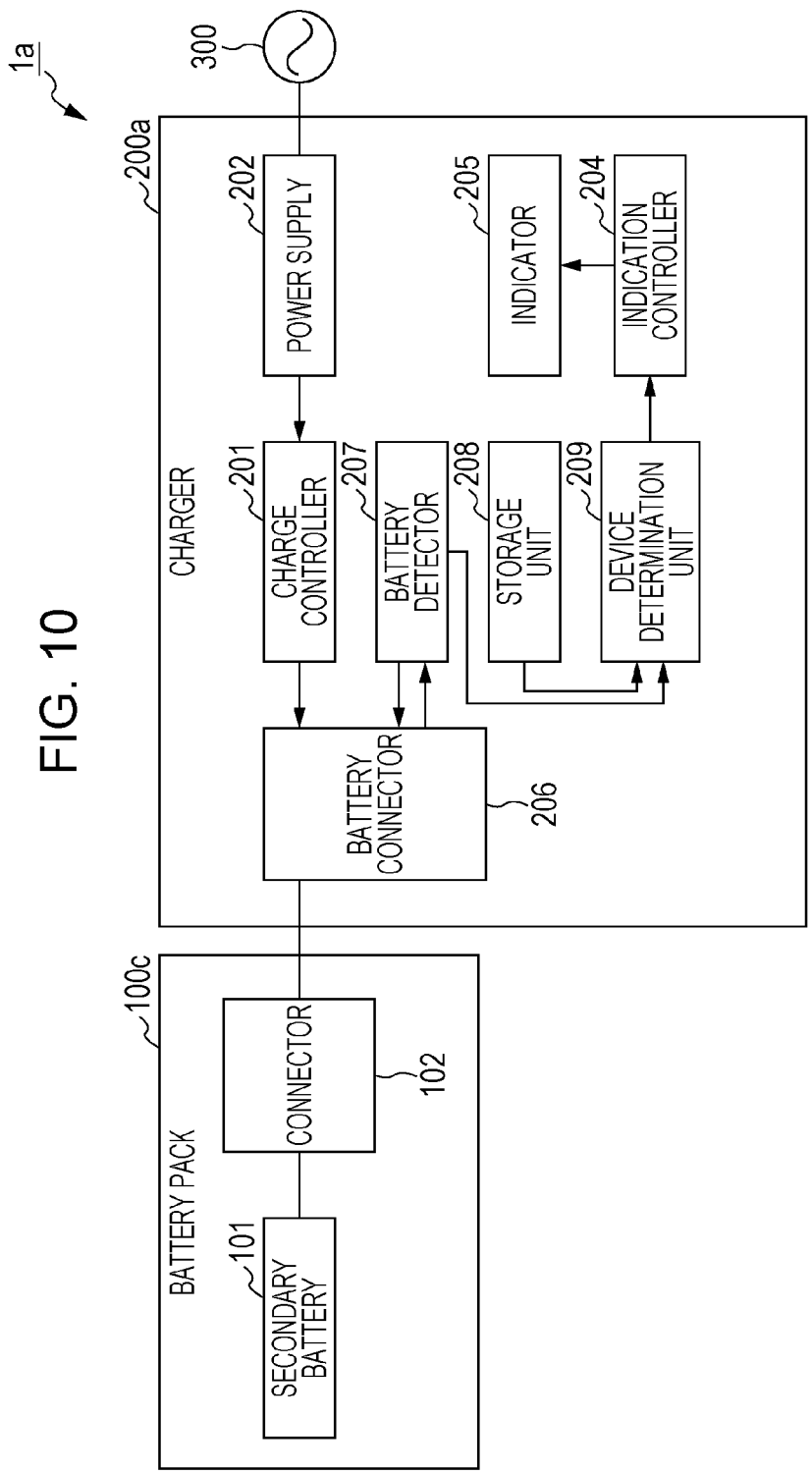
FIG. 10 is a block diagram showing an example of the configuration of a battery system according to a third embodiment.

FIG. 10 is a block diagram showing an example of the configuration of a battery system according to a third embodiment.

As shown in FIG. 10, a battery system 1a according to the third embodiment includes a battery pack 100c and a charger 200a.

The battery pack 100c differs from the battery packs 100, 100a, and 100b according to the first and second embodiments in that it includes only a secondary battery 101 and a connector 102. The configurations of the secondary battery 101 and connector 102 are similar to those of the corresponding elements of the battery pack 100 according to the first embodiment and therefore will not be described.

The charger 200a includes a charge controller 201, a power supply 202, an indication controller 204, an indicator 205, a battery connector 206, a battery detector 207, a storage unit 208, and a device determination unit 209.

The battery connector 206 differs from that of the second embodiment in that it is connected to the battery detector 207. The battery connector 206 is also connected to a connector 102 of the battery pack 100c. Specifically, the battery connector 206 is electrically connected to the connector 102 of the battery pack 100c in order to supply power for charging the battery pack 100c to the connector 102 of the battery pack 100c or cause the battery detector 207 to detect the state of the secondary battery 101 of the battery pack 100c.

The battery detector 207 detects the state of the secondary battery 101 of the battery pack 100c and outputs the detected state as secondary battery information. The storage unit 208 is storing a recommendation table in which conditions predetermined based on the state of the secondary battery 101 and recommended devices suitable for the conditions are previously associated with each other. The device determination unit 209 determines a recommended device using the state of the secondary battery indicated by the secondary battery information and the recommendation table. The indication controller 204 causes the indicator 205 to indicate information indicating the recommended device determined by the device determination unit 209. The indicator 205 indicates the information indicating the recommended device.

The functions of the battery detector 207, storage unit 208, device determination unit 209, and indication controller 204 are similar to those of the detectors 104, second storage units 106, determination units 107, and reporting units 108, respectively, of the battery packs 100, 100a, and 100b of the first and second embodiments and therefore will not be described.

The configurations of the charge controller 201, power supply 202, and indicator 205 are similar to those of the corresponding elements of the charger 200 described in the second embodiment and therefore will not be described in detail.

Figure 11:
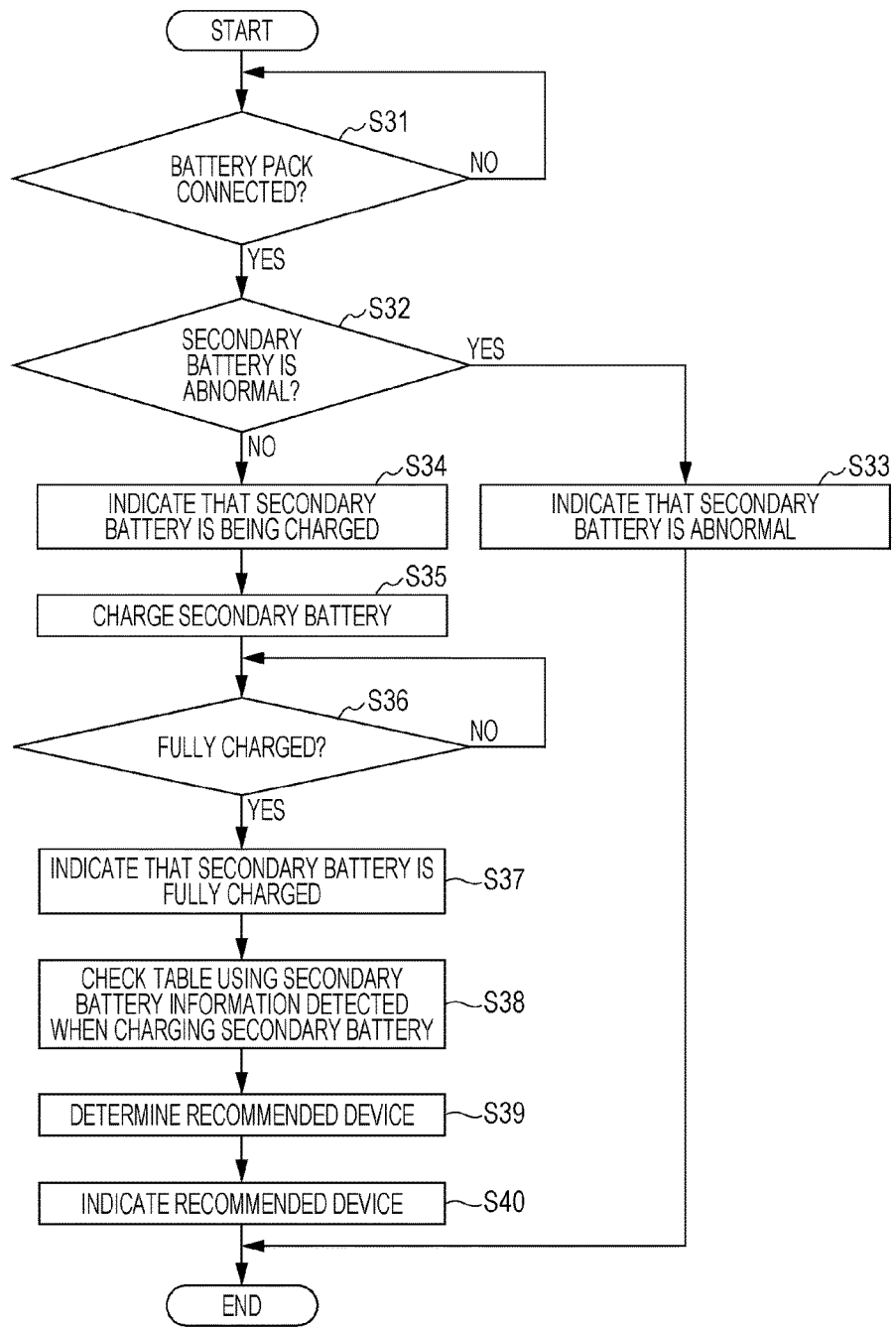
FIG. 11 is a flowchart showing a charging process performed by a charger according to the third embodiment.

FIG. 11 is a flowchart showing a charging process performed by the charger according to the third embodiment.

In the charger 200a, first, the battery detector 207 determines whether the battery pack 100c is connected to the battery connector 206 (S31). If so determined (S31: Yes), the battery detector 207 determines whether the secondary battery 101 of the battery pack 100c is abnormal (S32). If the battery detector 207 determines that the battery pack 100c is not connected to the battery connector 206 (S31: No), the process returns to step S31. That is, the battery detector 207 avoids detecting an abnormal state of the secondary battery 101 until the battery pack 100c is connected to the battery connector 206. The battery detector 207 detects an abnormal state of the secondary battery 101 of the battery pack 100c in a similar manner that the detector 104 of the first embodiment does.

If the battery detector 207 determines that the secondary battery 101 of the battery pack 100c is abnormal (S32: Yes), the indication controller 204 causes the indicator 205 to indicate information indicating that the secondary battery 101 of the battery pack 100c is abnormal (S33), thereby ending the charging process.

If the battery detector 207 determines that the secondary battery 101 of the battery pack 100c is not abnormal (S32: No), the indication controller 204 causes the indicator 205 to indicate information indicating that the secondary battery 101 of the battery pack 100c is being charged (S34).

The charge controller 201 charges the secondary battery 101 of the battery pack 100c (S35).

Subsequently, the battery detector 207 determines whether the secondary battery 101 of the battery pack 100c is fully charged (S36). If so determined (S36: Yes), the indication controller 204 causes the indicator 205 to indicate information indicating that the secondary battery 101 of the battery pack 100c is fully charged (S37). If not so determined (S36: No), the battery detector 207 repeats step S36. That is, the indication controller 204 avoids causing the indicator 205 to indicate information indicating the full-charge state until the battery detector 207 determines that the secondary battery 101 of the battery pack 100c is fully charged.

Subsequently, the device determination unit 209 checks the recommendation table using secondary battery information detected by the battery detector 207 during the charge leading to the current full charge (S38) and determines a recommended device on the basis of the check result in step S38 (S39).

The indication controller 204 reports the information indicating the recommended device determined by the device determination unit 209 to the user by causing the indicator 205 to indicate the information (S40), thereby ending the charging process.

In the battery system 1a according to the third embodiment, the charger 200a reports, to the user, a recommended device for which the battery pack 100c should be used, by detecting the state of the secondary battery 101 of the battery pack 100c connected to the battery connector 206, determining a recommended device using the detected state, and causing the indicator 205 of the charger 200a to indicate the determined recommended device. Thus, although the battery pack 100c does not include the detector 104, first storage unit 105, second storage unit 106, determination unit 107, and reporting unit 108 described in first and second embodiments, the charger 200a can determine a recommended device for which the battery pack 100c should be used and report the recommended device to the user.

While, in the third embodiment, the battery pack 100c includes only the secondary battery 101 and connector 102, these elements are the minimum elements for implementing the battery pack 100c of the third embodiment. Accordingly, even a battery pack having a different configuration can produce advantageous effects similar to those of the battery system 1a of the third embodiment, as long as it includes at least the secondary battery 101 and connector 102. That is, instead of the battery pack 100c, the battery pack 100, 100a, or 100b described in the first or second embodiment may be used.

Other Embodiments

Figure 12:
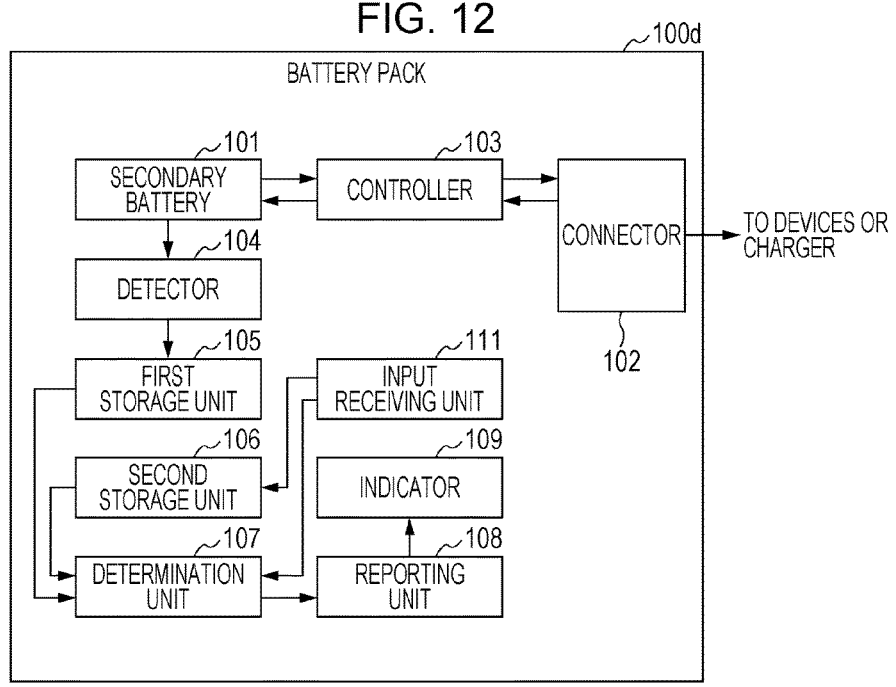
FIG. 12 is a block diagram showing another example of the configuration of the battery pack according to the first embodiment.

While the battery pack 100 according to the first embodiment does not include an input receiving unit for receiving input by the user, a battery pack 100d which further includes an input receiving unit 111 as shown in FIG. 12 may be employed. The battery pack 100d includes the elements of the battery pack 100 of FIG. 2, as well as the input receiving unit 111. Further, the battery pack 100d differs from the battery pack 100 in that a second storage unit 106 and determination unit 107 thereof perform processes on the basis of input received by the input receiving unit 111. The other elements of the battery pack 100d are similar to those of the battery pack 100 and therefore will not be described.

The input receiving unit 111 receives device information indicating devices. Specifically, the input receiving unit 111 receives device information, which is information indicating devices to one of which the connector 102 of the battery pack 100d is to be connected and to one of which the secondary battery 101 is to supply power. The second storage unit 106 stores a recommendation table in which multiple types of devices and the device information received by the input receiving unit 111 are associated with each other. The determination unit 107 determines a recommended device from the devices indicated by the device information associated with the types of devices in the recommendation table.

Since the battery pack 100d determines a recommended device from the devices indicated by the device information received by the input receiving unit 111, the indicator 109 indicates only the devices possessed by the user as recommended devices. Thus, any devices which are not possessed by the user are not recommended, and the user can easily determine a device for which the battery pack 100d should be used.

The input receiving unit 111 of the battery pack 100d shown in FIG. 12 may be used for purposes other than the reception of device information. For example, in response to the input receiving unit 111 receiving input, the recommendation indication process described in the first embodiment may be started. In the first embodiment, the recommendation indication process is started when the controller 103 determines that the charge of the secondary battery 101 is complete (step S21 in FIG. 7). Instead, the recommendation indication process of the battery pack 100d may be started when the user performs input for starting the recommendation indication process on the input receiving unit 111 (see above).

Figure 13:
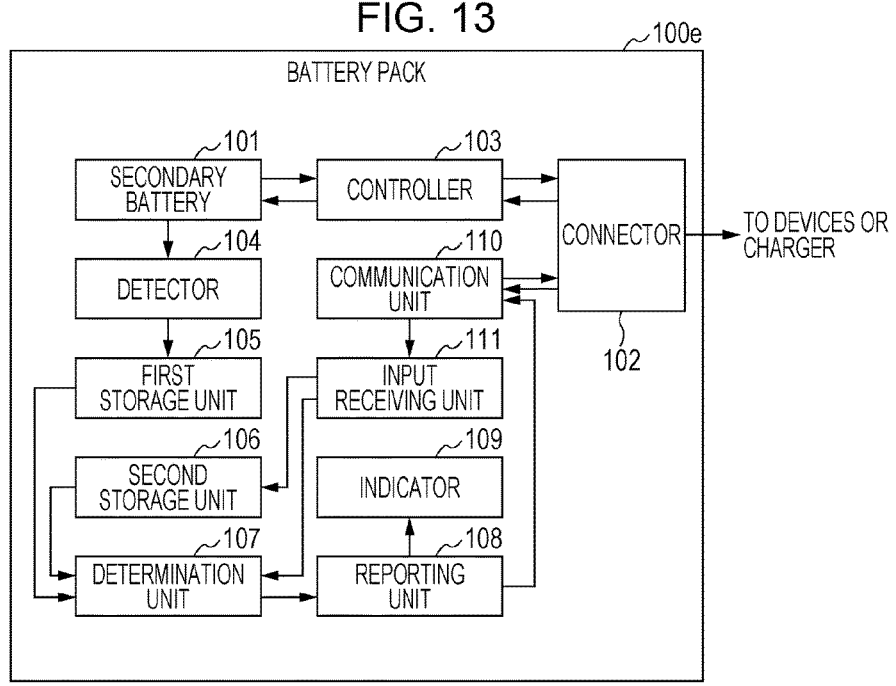
FIG. 13 is a block diagram showing another example of the configuration of the battery pack according to the second embodiment.

While the battery pack 100a according to the second embodiment does not include an input receiving unit, as with the battery pack 100, a battery pack 100e which further includes an input receiving unit 111 as shown in FIG. 13 may be employed. In this case, the configuration of the input receiving unit 111 may be similar to that of the input receiving unit 111 included in the battery pack 100d shown in FIG. 12 or may be different therefrom. The input receiving unit 111 having a different configuration may have a function of receiving input-related information from an external device through a communication unit 110. For example, the input receiving unit 111 may receive input from an external input device, such as a keyboard or touchscreen, connected to the battery pack 100e.

Further, the determination unit 107 and device determination unit 209 of the first and second embodiments may determine both a high-output-load device and a large-capacity-load device as recommended devices, for example, if the percentage-to-nominal-capacity SOC of the secondary battery 101 stored in the first storage units 105 and 208 are both X % or more and α% or more.

While, in the battery packs 100, 100a, 100b, 100d, and 100e according to the first and second embodiments, the first storage unit 105 and second storage unit 106 are separate storage units, these may be a single storage unit.

The elements in the above embodiments may be implemented by dedicated hardware or may be implemented by executing a software program which is suitable for the elements. The elements may also be implemented by causing a program execution unit, such as a CPU or processor, to read and execute a software program recorded in a recording medium, such as a hard disk or semiconductor memory.

While the battery packs and chargers according to one or more aspects of the present disclosure have been described based on the embodiments, the present disclosure is not limited to the embodiments. Various modifications of the embodiments conceived of by those skilled in the art and forms constructed by combining the elements of the different embodiments may also be included in the one or more aspects of the present disclosure without departing from the spirit and scope of the present disclosure.

The present disclosure is useful as a battery pack and charger which can provide an appropriate indication related to the use of the battery pack.

What is claimed is:
1. A battery pack comprising:
a secondary battery;
a connector that can be detachably and electrically connected to a plurality of devices of different types and to a charger;
control circuitry that controls power supply from the secondary battery to a device of the plurality of devices when the device is connected to the connector and controls charging of the secondary battery by the charger when the charger is connected to the connector;

a detector that detects a state of the secondary battery and outputs the detected state as secondary battery information;
a first memory that stores the secondary battery information output from the detector;
a second memory that stores a recommendation table in which a plurality of predetermined conditions related to the state of the secondary battery and the plurality of devices are stored in association with each other, wherein the plurality of predetermined conditions are different for each device; and
a processor that determines at least one recommended device, of the plurality of devices, suitable to be connected to the connector using the state of the secondary battery indicated by the secondary battery information and the recommendation table, by comparing the state of the secondary battery in the battery pack with each of the plurality of predetermined conditions different for each device, and by determining the at least one recommended device which is associated with a predetermined condition that is satisfied by the state of the secondary battery; and
the processor reports information indicating the determined at least one recommended device to a user.

2. A battery pack comprising:
a secondary battery;
a connector that can be detachably and electrically connected to a plurality of devices of different types and to a charger;
control circuitry that controls power supply from the secondary battery to a device of the plurality of devices when the device is connected to the connector and controls charging of the secondary battery by the charger when the charger is connected to the connector;
a detector that detects a state of the secondary battery and outputs the detected state as secondary battery information;
a first memory that stores the secondary battery information output from the detector;
a second memory that stores a recommendation table in which a plurality of predetermined conditions related to the state of the secondary battery and the plurality of devices are stored in association with each other; and
a processor that determines at least one recommended device, of the plurality of devices, suitable to be connected to the connector using the state of the secondary battery indicated by the secondary battery information and the recommendation table; and
the processor reports information indicating the determined at least one recommended device to a user, wherein
the detector detects a date and time when the secondary battery has been charged or discharged and outputs the detected date and time as the secondary battery information, and
when a period of time elapsed since the date and time is less than a predetermined value, the processor determines the at least one recommended device using the secondary battery information stored in the first memory and the recommendation table.

3. A battery pack comprising:
a secondary battery;
a connector that can be detachably and electrically connected to a plurality of devices of different types and to a charger;
control circuitry that controls power supply from the secondary battery to a device of the plurality of devices when the device is connected to the connector and controls charging of the secondary battery by the charger when the charger is connected to the connector;
a detector that detects a state of the secondary battery and outputs the detected state as secondary battery information;
a first memory that stores the secondary battery information output from the detector;
a second memory that stores a recommendation table in which a plurality of predetermined conditions related to the state of the secondary battery and the plurality of devices are stored in association with each other; and
a processor that determines at least one recommended device, of the plurality of devices, suitable to be connected to the connector using the state of the secondary battery indicated by the secondary battery information and the recommendation table; and
the processor reports information indicating the determined at least one recommended device to a user, wherein
the detector detects a date and time when the secondary battery has been charged or discharged and outputs the detected date and time as the secondary battery information, and
when a period of time elapsed since the date and time is a predetermined value or more, the processor determines the at least one recommended device using the secondary battery information detected by the detector when the charger is newly charging the secondary battery under the control of the control circuitry and using the recommendation table.

4. The battery pack according to claim 3, wherein, when the period of time elapsed since the date and time is the predetermined value or more, the processor stops reporting information indicating the at least one recommended device until the charger charges the secondary battery under the control of the control circuitry.

5. The battery pack according to claim 1, further comprising an indicator that indicates information indicating the at least one recommended device, wherein
the processor causes the indicator to indicate the information indicating the at least one recommended device.

6. The battery pack according to claim 1, wherein
the charger comprises an indicator, and
the processor transmits information indicating the at least one recommended device to the charger through the connector to cause the charger to indicate the information indicating the at least one recommended device.

7. The battery pack according to claim 1, further comprising a communication interface that communicates with an external communication terminal comprising an indicator, wherein
the processor transmits information indicating the at least one recommended device to the external communication terminal through the communication interface to cause the external communication terminal to display the information indicating the at least one recommended device.

8. The battery pack according to claim 1, wherein
the detector detects a percentage-to-nominal-capacity SOC of the secondary battery as the state of the secondary battery and outputs the detected percentage-to-nominal-capacity SOC as the secondary battery information,
when the percentage-to-nominal-capacity SOC is a predetermined value or more, the processor determines a first device as the at least one recommended device, and when the percentage-to-nominal-capacity SOC is less than the predetermined value, the processor determines a second device, an output load of which is lower than an output load of the first load, as the at least one recommended device.

9. The battery pack according to claim 1, wherein
the detector detects a charge/discharge cycle number of the secondary battery as the state of the secondary battery,
when the charge/discharge cycle number is less than a predetermined value, the processor determines a first device as the at least one recommended device, and
when the charge/discharge cycle number is the predetermined value or more, the processor determines a second device, an output load of which is lower than an output load of the first load, as the at least one recommended device.

10. The battery pack according to claim 1, wherein
the detector detects an internal resistance value of the secondary battery as the state of the secondary battery,
when the internal resistance value is less than a predetermined value, the processor determines a first device as the at least one recommended device, and
when the internal resistance value is the predetermined value or more, the processor determines a second device, an output load of which is lower than an output load of the first load, as the at least one recommended device.

11. The battery pack according to claim 1, wherein
the detector detects a battery voltage difference of the secondary battery as the state of the secondary battery,
when the battery voltage difference is less than a predetermined value, the processor determines a first device as the at least one recommended device, and
when the battery voltage difference is the predetermined value or more, the processor determines a second device, an output load of which is lower than an output load of the first load, as the at least one recommended device.

12. The battery pack according to claim 1, wherein
the detector detects a percentage-to-nominal-capacity SOC of the secondary battery as the state of the secondary battery,
when the percentage-to-nominal-capacity SOC is a predetermined value or more, the processor determines a device requiring a first capacity as the at least one recommended device, and
when the percentage-to-nominal-capacity SOC is less than the predetermined value, the processor determines a device requiring a second capacity, which is lower than the first capacity, as the at least one recommended device.

13. The battery pack according to claim 1, wherein
the detector further detects an abnormal state of the secondary battery, and
when the detector detects an abnormal state of the secondary battery, the processor reports information indicating the abnormal state to a user.

14. The battery pack according to claim 1, further comprising an input receiver that receives device information, wherein
the second memory stores the recommendation table, in which at least one device of the plurality of devices and the device information received by the input receiver are associated with each other, and
the processor determines the at least one recommended device, of the at least one device associated with the device information in the recommendation table.

15. A charger for charging a battery pack which comprises a secondary battery and can be used for a plurality of devices of different types, the charger comprising:
a connector that is detachably and electrically connected to the battery pack;
charging control circuitry that charges the battery pack through the connector;
a detector that detects a state of the secondary battery through the connector and outputs the detected state as secondary battery information;
a memory that stores a recommendation table in which a plurality of predetermined conditions related to the state of the secondary battery and the plurality of devices are stored in association with each other, wherein the plurality of predetermined conditions are different for each device;
a processor that determines at least one recommended device, of the plurality of devices, suitable to be connected to the battery pack using the state of the secondary battery indicated by the secondary battery information and the recommendation table, by comparing the state of the secondary battery in the battery pack with each of the plurality of predetermined conditions different for each device, and by determining the at least one recommended device which is associated with a predetermined condition that is satisfied by the state of the secondary battery;
an indicator; and
indication control circuitry that causes the indicator to indicate information indicating the at least one recommended device determined by the processor.

16. The battery pack according to claim 1, wherein the connector can be mechanically detachably attached to one of the plurality of devices.

17. The battery pack according to claim 1, wherein the processor determines the at least one recommended device suitable to be connected to the connector, when the secondary battery in the battery pack is not connected to one of the plurality of devices.

18. The battery pack according to claim 5, wherein the indicator comprises a visual indicator integrally attached to the battery pack.

* * * * *